United States Patent Office 3,501,429
Patented Mar. 17, 1970

3,501,429
PROCESS FOR PREPARING STABLE CONDENSATION RESINS OF ALDEHYDES, AMINOTRIAZINES AND POLYHYDROXYL COMPOUNDS AND PRODUCTS OBTAINED THEREBY
Francis A. Bonzagni, Springfield, Mass., assignor to Monsanto Company, St. Louis, Mo., a corporation of Delaware
No Drawing. Filed Mar. 2, 1966, Ser. No. 531,051
Int. Cl. C08g 9/34
U.S. Cl. 260—17.3          5 Claims

ABSTRACT OF THE DISCLOSURE

Disclosed herein is a process for producing solution stable resins which comprises the steps of reacting together under alkaline conditions a resin forming amino compound and an aldehyde, the molar ratio of aldehydes to amino compounds being at least 8:1, further reacting the mixture under acid conditions with a polyhydroxyl containing compound; and then reacting the mixture under neutral conditions with additional amino compounds until the resins have a water dilutability endpoint of 30–45%. Laminating syrups and laminates prepared therefrom employing the products of the claimed process are also claimed as are the products themselves.

---

This invention relates to condensation resins which exhibit longlasting stability in solution.

Condensates of resin forming amino compounds and aldehydes are extensively used today. Melamine-formaldehyde condensation products find particular use in the preparation of laminates. The poor solution stability of such condensation resins is well known and many proposals have been made to improve the solution stability of such resins. For example, such resins have been modified with ureas, sulfonamides, alcohols, sugars and polyhydroxyl containing compounds in general. Although the solution stability of such resins has been improved to some degree by modification as taught in the art, further improvement is highly desirable.

Accordingly, typical objects of this invention are to provide improved: (1) solution stable condensation resins; (2) solutions, particularly aqueous solutions, of condensation resins which exhibit longlasting stability; (3) process for producing solution stable condensation resins; and (4) laminates prepared from condensation resins.

Other objects, aspects and advantages of this invention will become apparent upon further study of this disclosure and the appended claims.

In accordance with the basic aspect of this invention, a process is provided which broadly comprises a conventional alkaline addition reaction of a resin forming amino compound and an aldehyde, the mols of aldehyde present being greater than 1 mol per reactive hydrogen atom contained on the amino compound; followed by an acidic reaction of the mixture with a polyhydroxyl containing compound; and further followed by a conventional basic resinification of the mixture with additional resin forming amino compound. In another aspect, novel resinous co-condensation products are provided which comprises a resin forming amino compound, an aldehyde and a polyhydroxyl containing compound wherein at least 80% of the reactive hydrogen atoms contained on a minor portion of the resin forming amino compound are combined with molecules of said aldehyde and acid etherified with a polyhydroxyl containing compound. In still another aspect, longlasting solutions of condensation resins are provided which comprise the novel resinous co-condensation products of this invention with water, water-alcohol mixtures, or the reaction mixture of the process of this invention. In a further aspect, laminates having improved gloss and postforming properties are provided by using solutions of the novel resinous co-condensation products of this invention as the impregnating laminating syrups.

In practicing the process of this invention, an initial reaction mixture is formed which contains an aldehyde and a resin forming amino compound. Generally, this initial mixture contains the total quantity of aldehyde to be reacted and a designed portion of the resin forming amino compound to be reacted. However, a portion of the aldehyde can be withheld and introduced into the process later. The polyhydroxyl containing compound may be present in the initial mixture or introduced after the alkaline addition reaction. The polyhydroxyl containing compound does not adversely affect the initial alkaline reaction and generally will be added to the initial mixture.

The invention will now be described in more detail in the following examples which are set forth for illustration and are not to be construed as limitations upon the scope of the invention. Unless otherwise noted, where quantities are mentioned they are parts by weight.

Example I

Mix together 372 parts of Formalin (50% formaldehyde), 0.22 part of 50% NaOH, 165.6 parts of sucrose, and 78 parts of melamine. Adjust the pH of the mixture to 8.5–8.7 with 50% NaOH or 85% formic acid and then heat the mixture to initiate the reaction. The heat of reaction causes the temperature to rise. Hold the mixure at 70–75° C. with cooling, if necessary, for 10 minutes and then cool the mixture to 65° C. Add 0.34 part of 96% H₂SO₄, adjust the pH of the mixture to 4.0–5.0 and continue the reaction at 65±2° C. for 15 minutes. Then add 1.09 parts of 50% NaOH, 234 parts of melamine and adjust the pH of the mixture to 9.0–9.5. Heat the mixture and continue the reaction at 93–97° C. until the resin has a water dilutability of 37–39%. Add water to dilute the resin to 65% solids and cool the mixture to end the reaction.

The resin solution produced by this example can be stored without precipitation or gellation of the resin for periods of time, i.e. 10–15 weeks, as long as or longer than conventional melamine-formaldehyde resins or similarly modified melamine resins produced by conventional neutral or alkaline reactions.

The process of this invention can be carried out within a wide range of operating variables. The molar ratio of aldehyde to the amino compound employed in the initial alkaline reaction is at least that which provides 1 mol of aldehyde per each reactive hydrogen contained in the amino compound and generally the molar ratio of aldehyde to amino compound will be about 8:1 to 25:1 and preferably about 10:1 to 15:1. A greater excess of aldehyde present in the initial mixture will be limited only by practical operating standards. In the final basic resinification reaction the molar ratio of aldehyde to amino compound can range from about 0.5:1 to 6:1 and preferably about 1:1 to 3:1. The polyhydroxyl compound can vary between about 5 to 65 parts and preferably about 15-25 parts by weight of the other reactive components. Operating conditions for the pH and temperature variables can be varied as follows:

| Process Step | pH Range | | Temperature Range | |
|---|---|---|---|---|
| | Broad | Preferred | Broad, °C. | Preferred, °C. |
| Alkaline reaction | 7.5-9.5 | 8.5-9.0 | 60-100 | 70-80 |
| Acid reaction | 2.5-6.5 | 3.5-5.0 | 55-85 | 60-70 |
| Basic resinification | 8.5-10.0 | 9.0-9.5 | 75-105 | 90-100 |

The resins of this invention are characterized by the ratio of reactants contained therein, the acidized etherification with the polyhydroxyl containing compound and the degree of condensation. The resins are condensed to the stage at which they have a water dilutability point of 30-45%. The water dilutability point is defined as the weight percent resin solids to which an aqueous resin solution can be diluted with water at 25° C. before incipient precipitation of the resin occurs. The resins of this invention can contain other materials such as fillers, pigments and other modifiers such as sulfonamides.

Example II

Mix together 240 parts of Formalin (50% formaldehyde), 0.14 part of 50% NaOH, 45 parts of sucrose, 31.5 parts of melamine and 0.15 part of triethanolamine. Adjust the pH of the mixture to 8.5-8.7 with 50% NaOH or 85% formic acid and then heat the mixture to initiate the reaction. The heat of reaction causes the temperature to rise. Hold the mixture at 70-75° C. with cooling, if necessary, for 10 minutes and then cool the mixture to 65° C. Add 0.22 part of 96% $H_2SO_4$, adjust the pH of the mixture to 4.0-5.0 and continue the reaction at $65 \pm 2°$ C. for 15 minutes. Then add 0.7 part of 50% NaOH, 234 parts of melamine and adjust the pH of the mixture to 9.0-9.5. Heat the mixture and continue the reaction at 93-97° C. until the resin has a water dilutability of 30-33%. Add water to dilute the resin to 65% solids and cool the mixture to end the reaction.

The resin produced by this example is equivalent to the resin of Example I. Furthermore, the presence of triethanolamine in the reaction mixture allows the resin to be advanced to a water dilutability of 30% while still retaining effective solution stability.

Example III

Prepare a decorative laminate as follows: impregnate 7 substrate sheets of kraft paper with about 35% of a commercially available phenol-formaldehyde resin and an alpha cellulose print sheet with about 40 weight percent of a conventional melamine-formaldehyde resin. Overlay one half of the panel with a 4 mil alpha cellulose sheet and the other half with a 4 mil viscose rayon paper both impregnated with about 65 weight percent of the resin obtained from Example I. Press the laminate for 20 minutes at 290° C. under a pressure of 1000 lbs. per square inch.

The transparency and gloss of both halves of the laminate prepared above is substantially the same and is better than that of similar laminates prepared from conventional resins.

Any resin forming amino compound can be employed in this invention. The aminotriazine compounds, such as melamine, substituted melamines, cycloaliphatic guanamines, and mixtures thereof are preferred for this invention. Suitable substituents for the melamine are 1-6 carbon atom, preferably 1-4 carbon atom alkyl groups and 1-2 phenyl groups. Examples of such substituted melamines are monomethyl melamine, dimethyl melamine, trimethyl melamine, tetramethyl melamine, monoethyl melamine, 1-methyl-3-propyl-5-butyl melamine, monophenyl melamine, diphenyl melamine, and the like. Cycloaliphatic guanamines, in general, can be employed in this invention. Preferably, they will not contain more than 15 carbon atoms. Examples of suitable cycloaliphatic guanamines are tetrahydrobenzoguanamine, hexahydrobenzoguanamine, 3-methyl-tetrahydrobenzoguanamine, 3-methyl-hexahydrobenzoguanamine, 3,4-dimethyl-1,2,5,6-tetrahydrobenzoguanamine, 3,4-dimethyl-hexahydrobenzoguanamine, and the like. A preferred cycloaliphatic guanamine is tetrahydrobenzoguanamine. Desirable mixtures of aminotriazine compounds are melamine and dimethyl melamine, melamine and tetrahydrobenzoguanamine, and the like. When employing a mixture of aminotriazine compounds as for example, melamine and tetrahydrobenzoguanamine, the mixture should consist of 95-5 weight percent of melamine and, correspondingly, 5-95 weight percent of tetrahydrobenzoguanamine. The same limits of the mixture would apply when using any mixture of the aminotriazine compounds. A preferred mixture is 75-95 weight percent of melamine and, correspondingly, 25-5 weight percent of tetrahydrobenzoguanamine.

Any aliphatic aldehyde which will condense with the resin forming amino compounds can be employed in this invention. Particularly useful are acetaldehyde, butyraldehyde, formaldehyde, crotonic aldehyde, acrolein, heterocyclic aldehydes such as alpha-chlorobutyraldehyde, and the like. The preferred aldehyde to be employed in the practice of this invention is formaldehyde.

If desired, thiourea may be included in the resins of this invention in amounts of up to about 2.5 parts per 97.5 parts of an aminotriazine compound. The presence of this quantity of thiourea accelerates the cure rate of the resin and also increases the gloss of laminates prepared therefrom. In addition, the presence of thiourea in the resin permits decorative laminates having overlay sheet impregnated therewith to be removed from the press hot with little or no loss of gloss. In another embodiment of the invention, comparable results are obtained by admixing thiourea with a solution of a resin of this invention in amounts of up to about 2.5 parts per 97.5 parts of melamine contained in the resin.

The polyhydroxyl-containing compounds applicable to this invention include sucrose, ethylene glycol, disaccharide, dextrin, corn syrup, starch hydrolyzates, glycerin, benzyl alcohol, sorbitol, diethylene glycol, and the like. The preferred polyhydroxyl containing compound is sucrose. The polyhydroxyl containing compound may be added either at the start of the acidic reaction or at the beginning of the reaction and thus present during the initial alkaline reaction. The polyhydroxyl containing compound is employed in an amount of between about 5-65 parts per 100 parts of the amino compound. Optimum solution stability is attained when the resins contain about 15-50 weight percent of the polyhydroxyl-containing compound and optimum postformability is attained when the resins contain 20 or more weight percent thereof. An optimum balance of properties of transparency, solution stability and postformability is attained when the resins contain about 15-25 weight percent of the polyhydroxyl-containing compound. When using the melamine-sucrose combination, the molar ratio will generally be 1:0.3 to 1:3.0 melamine:sucrose.

When the resins of the invention are to be employed as laminating syrups, 40–60 weight percent of the resin should be dissolved in a corresponding 60–40 weight percent of a solvent consisting of either water or a mixture of a major amount of water and a minor amount of an alcohol containing 1–4 carbon atoms, e.g., methanol, ethanol, ethylene glycol, glycerine, propylene glycol, and the like. The precise quantity of alcohol required in the water-alcohol solvent media will depend upon the specific structure of the resin, but generally will be within the range of 0.5–40 weight percent and as a practical matter 0.5–20 weight percent and preferably less than 5 weight percent. Laminating syrups of the above type may be stored at temperatures in the range of 20–30° C. with little or no precipitation of the resin from the solution.

The preparation of laminates employing the resins of this invention generally follows procedures which are well known in the art. Inert filler sheets of alpha-cellulose paper, viscose rayon paper, glass cloth or cloth prepared from cotton, wool or synethetic fibers are impregnated with 30–80 weight percent of the resin and dried to a volatile content of the order of 3–10 percent. An assembly of such resin-impregnated sheets is then subjected to a pressure of the order of 100–2000 pounds per square inch and heated for 5–60 minutes at a temperature of 200–400° F.

When preparing laminates employing the resins of this invention, it may be desirable to add a catalyst to the resin in order to aid in the curing process of the treated filler sheets. Common catalysts so employed are those catalysts which liberate acid when subjected to heat and are added in an amount varying from 0.1–10.0 weight percent based on the weight of the resin solids and, preferably, will vary from 0.5–4.0 weight percent. Such catalysts include to organic and inorganic acid salts of primary, secondary, and tertiary amines such as the hydrochloric acid salt of 2-amino-2-methyl-propanol-1, the hydrochloric acid salts of mono-, di-, and tri-ethanolamine, the hydrochloric acid salts of 2-dimethylamino-2-methyl propanol, the para-toluenesulfonic acid salt of aminomethyl propanol-1, the chloroacetic acid salt of pyridine, the tri-ammonium acid pyrophosphate salt of aminomethyl propanol-1, the phosphoric acid salt of 2-amino-2-methyl propanol-1, the phosphoric acid salt of mono-, di- and tri-ethanolamines, the phosphoric acid salt of 2-dimethyl-amino-2-methyl propanol, ethylene sulfite, etc. Other catalysts include the inorganic salts of inorganic acids such as ammonium chloride, magnesium chloride, zinc chloride, and the like. In fact, the catalyst system may include mixtures of the above different types of catalysts such as a mixture of magnesium chloride and the hydrochloric acid salt of 2-amino-2-methyl propanol-1, a mixture of the hydrochloric acid salt of monoethanolamine and diethanolamine, and the like. The catalyst can be added to the kettle near the end of the condensation reaction or it may be added to the laminating syrup when used to prepare laminates.

Decorative laminates are prepared from an assembly or (1) a rigid substrate, (2) a resin-impregnated print sheet, i.e., a paper sheet having a design printed thereon, and (3) a resin-impregnated top or overlay sheet. In such decorative laminates, the rigid substrate may consist of any suitable material such as plywood, a resin bonded wood fiber board or the like, a plurality of resin-impregnated sheets, and the like. The printed sheet preferably is impregnated with a resin of this invention, although in other embodiments of the invention the print sheet can be impregnated with an unmodified melamine-formaldehyde resin or a melamine-formaldehyde resin that is modified with minor amounts of other compound such as toluene sulfonamide or an omega cyanoalkylguanamine. The overlay sheet is impregnated with a resin of this invention. Although the overlay sheet may be viscose rayon paper, an outstanding feature of the invention is that excellent transparency is obtained even when the overlay sheet is a high alpha-cellulose paper. This is a matter of considerable importance, since the viscose rayon papers presently employed in the overlay sheet are considerably more expensive than the high alpha-cellulose papers which are employed as the print sheet. High alpha-cellulose papers are defined as those in which the fibrous web consists of at least 90 weight percent of alpha-cellulose.

Where decorative laminates having postforming properties are desired, the rigid substrate must be of a postformable material such as a plurality of paper sheets (preferably creped) impregnated with specially formulated postformable varnish such as phenol-formaldehyde resins, cresol-phenol-formaldehyde resins, etc. The print sheet must be impregnated with either the resins of the present invention or another postformable aminoplast resin such as a melamine-toluene sulfonamide-formaldehyde resin or a melamine-omega cyanoalkylguanamine-formaldehyde resin or mixtures of other known postformable aminoplast resins. The overlay sheet is impregnated with a resin composition of this invention.

The resinous condensation product of this invention can also be used in such other applications as the bonding of fibers to form fibrous structures which are used as oil filter, water filters, air filters, thermal insulation, molded furniture parts, etc., as orthopedic resins, as the bonding of wood veneer to form laminate plywood structures and for high density molded objects which may or may not employ powdered mica, asbestos, cellulosic fibers such as bleached alpha-cellulose flock, unbleached alpha-cellulose flock and may include pigments.

It will thus be seen that the objects set forth above, among those made apparent from the description, are efficiently attained. It will be apparent that changes may be made in carrying out the above defined process and in the composition set forth without departing from the scope of this invention. Thus, it is intended that all matters contained in the above description shall be interpreted as illustrative and not in a limiting sense.

What is claimed is:

1. A process for producing solution stable resins which comprises forming a reaction mixture containing an aliphatic aldehyde and an aminotriazine in a molecular proportion of at least 8:1, respectively; adjusting the pH value of the reaction mixture to between about 7.5 to 9.5; heating the reaction mixture to a temperature between about 60 to 100° C. to initiate an addition reaction between the aliphatic aldehyde and aminotriazine; continuing such addition reaction to the stage where the aliphatic aldehyde has attached to at least 80% of the aminotriazine functional hydrogen atoms and then discontinuing the addition reaction; adjusting the pH value of the reaction mixture to between about 2.5 to 6.5; heating the reaction mixture to a temperature between about 55 to 85° C. to initiate an etherification reaction between the addition reaction product and a polyhydroxyl containing compound; continuing such etherification reaction at least to where the polyhydroxyl compound has attached to at least a portion of the aliphatic aldehyde additions on the aminotriazine; and then discontinuing the etherification reaction; adjusting the pH value of the reaction mixture to between about 7.5 to 10.5; adding additional aminotriazine; heating the reaction mixture to a temperature between about 75 to 100° C. to form a liquid resinous product having a molar ratio of aliphatic aldehyde to aminotriazine between about 0.5:1 to 3:1, respectively, and a water dilutability endpoint between about 30 to 45%.

2. The process of claim 1 wherein the reaction mixture further contains 0.02 to 0.5 weight percent of triethanolamine.

3. The process of claim 1 wherein melamine and formaldehyde in a molar ratio between 1:10 to 1:15, respectively, are reacted together at a pH between about 8.5 to 9.0 and a temperature between about 70 to 80° C. until at least 80% of the melamine reactive hydrogens have combined with the formaldehyde; then the methylolated melamine and sucrose in a molar ratio between about 1:0.3 to 1:3.0, respectively, are reacted together at a pH between about 3.5 to 5.0 and at a temperature between about 60 to 70° C. until at least a portion of the methylol groups on the melamine have combined and formed ether linkages with the sucrose; and then reacting the mixture with additional melamine until the resin has a formaldehyde-melamine molar ratio of between about 0.5:1 to 3:1, respectively, and a water dilutability endpoint between 30 to 45%.

4. A laminating syrup that is stable for an extended period of time comprising 40–60 weight percent of a resin of claim 1 in solution with 60–40 weight percent of a solvent selected from the group consisting of water and mixtures of a major amount of water and a minor amount of 1–4 carbon atom alcohols.

5. The laminating syrup of claim 4 wherein the resin of claim 1 is a melamine-formaldehyde-sucrose condensate.

References Cited

UNITED STATES PATENTS

| | | | |
|---|---|---|---|
| 2,197,357 | 4/1940 | Widmer et al. | 260—17.3 |
| 2,616,861 | 11/1952 | Jones | 260—15 |
| 3,194,720 | 7/1965 | Grudus et al. | 260—17.3 |

FOREIGN PATENTS

| | | |
|---|---|---|
| 247,108 | 8/1963 | Australia. |
| 1,056,216 | 1/1967 | Great Britain. |

WILLIAM H. SHORT, Primary Examiner

U.S. Cl. X.R.

260—29.4, 67.6